(12) United States Patent
Kumabe et al.

(10) Patent No.: US 10,735,911 B2
(45) Date of Patent: Aug. 4, 2020

(54) WIRELESS COMMUNICATION DEVICE

(71) Applicant: DENSO CORPORATION, Kariya, Aichi-pref. (JP)

(72) Inventors: Seigou Kumabe, Kariya (JP); Takahisa Yamashiro, Kariya (JP); Naoyuki Kida, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 339 days.

(21) Appl. No.: 15/527,349

(22) PCT Filed: Dec. 8, 2015

(86) PCT No.: PCT/JP2015/006105
§ 371 (c)(1),
(2) Date: May 17, 2017

(87) PCT Pub. No.: WO2016/098313
PCT Pub. Date: Jun. 23, 2016

(65) Prior Publication Data
US 2018/0027388 A1 Jan. 25, 2018

(30) Foreign Application Priority Data

Dec. 18, 2014 (JP) ................................ 2014-256565

(51) Int. Cl.
H04W 4/06 (2009.01)
H04W 4/40 (2018.01)
(Continued)

(52) U.S. Cl.
CPC ............ H04W 4/06 (2013.01); G06Q 20/322 (2013.01); H04W 4/40 (2018.02); H04W 4/44 (2018.02)

(58) Field of Classification Search
CPC .......... H04W 4/06; H04W 4/44; H04W 4/04; G06Q 20/322; G06Q 20/327
See application file for complete search history.

(56) References Cited

U.S. PATENT DOCUMENTS 8,761,676 B2 6/2014 Hu et al.
2005/0148347 A1 7/2005 Nagai
(Continued)

FOREIGN PATENT DOCUMENTS

JP 2004015269 A * 1/2004
JP 2004326470 A * 11/2004
(Continued)

OTHER PUBLICATIONS

"IEEE Guide for Wireless Access in Vehicular Environments (WAVE) Architecture", IEEE Vehicular Technology Society, IEEE Std 1609.0 2013.

Primary Examiner — Namrata Boveja
Assistant Examiner — Joseph F. Ecker
(74) Attorney, Agent, or Firm — Harness, Dickey & Pierce, P.L.C.

(57) ABSTRACT

A wireless communication device used in a vehicle is provided, includes a communicator that performs wireless communication with a service provider terminal, a vehicle condition acquirer that acquires a condition of the vehicle, a correspondence storage that stores a correspondence of what type of service is available under what condition of the vehicle, and an availability determiner that determines whether the service provided by the service provider terminal is available under the condition of the vehicle acquired by the vehicle condition acquirer, based on service type information included received by the communicator, the condition of the vehicle acquired by the vehicle condition acquirer, and the correspondence stored in the correspondence storage. When the availability determiner determines (Continued)

that the service is unavailable, the communicator does not open a service channel designated by the service provider terminal.

7 Claims, 8 Drawing Sheets

(51) Int. Cl.
  *H04W 4/44* (2018.01)
  *G06Q 20/32* (2012.01)

(56) References Cited

U.S. PATENT DOCUMENTS

| | | | |
|---|---|---|---|
| 2012/0184298 A1* | 7/2012 | Moons | G07B 15/02 455/456.2 |
| 2012/0295536 A1* | 11/2012 | Klatt | H04W 4/021 455/3.01 |
| 2014/0211749 A1* | 7/2014 | Sakata | H04W 4/70 370/329 |
| 2015/0358481 A1 | 12/2015 | Nagata et al. | |

FOREIGN PATENT DOCUMENTS

| | | | |
|---|---|---|---|
| JP | 2005-050248 A | | 2/2005 |
| JP | 2008170218 A | * | 7/2008 |
| JP | 2014-131236 A | | 7/2014 |
| KR | 20080053681 A | * | 6/2008 |
| KR | 20110027203 A | * | 3/2011 |
| KR | 20110096952 A | * | 8/2011 |
| WO | WO-2004089008 A1 | | 10/2004 |

\* cited by examiner

WIRELESS COMMUNICATION DEVICE

CROSS-REFERENCE TO RELATED APPLICATIONS

This application is a U.S. National Phase Application under 35 U.S.C. 371 of International Application No. PCT/JP2015/006105 filed on Dec. 8, 2015 and published in Japanese as WO 2016/098313 A1 on Jun. 23, 2016. This application is based on and claims the benefit of priority from Japanese Patent Application No. 2014-256565, filed on Dec. 18, 2014. The entire disclosures of all of the above applications are incorporated herein by reference.

TECHNICAL FIELD

The present disclosure relates to a wireless communication device used in a vehicle.

BACKGROUND ART

As is disclosed in Patent Literature 1, WAVE (Wireless Access in Vehicular Environments) is conventionally known as a standard used in intelligent transport systems (ITS).

In the WAVE standard, a control channel (CCH) and a service channel (SCH) independently exist. The control channel is used to transfer a control signal necessary for connection control. The service channel is used to provide a service. The service channel includes a plurality of types having different frequencies on a service basis.

A WSA (Wave Service Advertisement) is transmitted on the control channel from a provider terminal to a vehicle terminal. The WSA includes information that specifies the type of service to be provided and the frequency to be used to provide a service. When a service type included in the WSA received from the provider terminal matches a service available to a subject terminal, that is, the vehicle terminal, the vehicle terminal opens a service channel having the frequency specified by the WSA.

PRIOR ART LITERATURE

Patent Literature

Patent Literature 1: U.S. Pat. No. 8,761,676B

SUMMARY OF INVENTION

In some cases, however, services available to the vehicle terminal may be unnecessary depending on the condition of a vehicle using the terminal. For example, a payment service for automatically paying for goods purchased at a store is unnecessary while the vehicle is traveling without a stop. While a service channel for a certain service is open, the vehicle terminal is unable to open another channel having a different frequency. Thus, while a service channel for an unnecessary service is open, a service channel for a service necessary for a user cannot be opened. Consequently, using conventional technologies may delay the opening of a service channel for a service necessary for the user.

In view of the above circumstances, an object of the present disclosure is to provide a wireless communication device that is capable of suppressing the delay in the opening of a service channel for a service necessary for a user.

In an aspect of the present disclosure, a wireless communication device used in a vehicle comprises: a communicator that performs wireless communication with a service provider terminal, wherein the service provider terminal switches between a control channel for communication connection control and a plurality of service channels for service provision, wherein the communicator receives a service initiation notice, which is transmitted on the control channel from the service provider terminal and which includes service type information indicative of type of service provided by the service provider terminal and channel designation information designating a service channel to be used for service provision from the service provider terminal; a vehicle condition acquirer that acquires a condition of the vehicle; a correspondence storage that stores a correspondence of what type of service is available under what condition of the vehicle; and an availability determiner that determines whether the service provided by the service provider terminal from which the service initiation notice is transmitted is available under the condition of the vehicle that is acquired by the vehicle condition acquirer, based on the service type information included in the service initiation notice received by the communicator, the condition of the vehicle that is acquired by the vehicle condition acquirer, and the correspondence stored in the correspondence storage. When the availability determiner determines that the service is unavailable, the communicator does not open the service channel designated by the channel designation information included in the service initiation notice.

The correspondence stored in the correspondence storage is a correspondence between the type of service targeted for the subject device and the vehicle condition under which this service is available. Therefore, whether the service provided by the service provider terminal from which the service initiation notice is transmitted is available under the vehicle condition acquired by the vehicle condition acquirer can be determined by the availability determiner depending on whether the service type information included in the service initiation notice received by the communicator and the vehicle condition acquired by the vehicle condition acquirer are in agreement with the correspondence stored in the correspondence storage.

The service determined by the availability determiner to be unavailable under the vehicle condition acquired by the vehicle condition acquirer is not available under the current vehicle condition. Thus, it can be said that the service is unnecessary for the user. The communicator does not open a service channel for a service unnecessary for the user. This suppresses the occurrence of a situation where a service channel for a service necessary for the user cannot be opened due to a service channel already opened for an unnecessary service. As a result, the delay in the opening of the service channel for the service necessary for the user can be suppressed.

In a second aspect of the present disclosure, a wireless communication device used in a vehicle comprises: a communicator that performs wireless communication with a service provider terminal, wherein the service provider terminal switches between a control channel for communication connection control and a plurality of service channels for service provision, wherein the communicator receives a service initiation notice, which is transmitted on the control channel from the service provider terminal and which includes service type information indicative of type of service provided by the service provider terminal and channel designation information designating a service channel to be used for service provision from the service provider terminal, wherein the communicator, upon receipt of the service initiation notice, opens a service channel designated by the channel designation information included in the service initiation notice; a vehicle condition acquirer that acquires a condition of the vehicle; a correspondence storage that stores a correspondence of what type of service is available under what condition of the vehicle; and an availability determiner that determines whether the service provided by the service provider terminal from which the service initiation notice is transmitted is available under the condition of the vehicle that is acquired by the vehicle condition acquirer, based on the service type information included in the service initiation notice received by the communicator, the condition of the vehicle that is acquired by the vehicle condition acquirer, and the correspondence stored in the correspondence storage. When the availability determiner determines that the service is unavailable, the communicator closes the service channel that is opened based on the channel designation information included in the service initiation notice.

The correspondence stored in the correspondence storage is a correspondence between the type of service targeted for the subject device and the vehicle condition under which this service is available. Therefore, whether the service provided by the service provider terminal from which the service initiation notice is transmitted is available under the vehicle condition acquired by the vehicle condition acquirer can be determined by the availability determiner depending on whether the service type information included in the service initiation notice received by the communicator and the vehicle condition acquired by the vehicle condition acquirer are in agreement with the correspondence stored in the correspondence storage. The service determined by the availability determiner to be unavailable under the vehicle condition acquired by the vehicle condition acquirer is not available under the current vehicle condition. Thus, it can be said that the service is unnecessary for the user.

Even when a service channel is opened based on the channel designation information included in the service initiation notice, the communicator closes the service channel if the availability determiner determines that the service provided on the service channel is unavailable. Thus, even when a service channel for a service unnecessary for the user is opened, the service channel can be closed immediately. Therefore, a service channel for an unnecessary service does not remain open. This suppresses the occurrence of a situation where a service channel for a service necessary for the user cannot be opened. As a result, the delay in the opening of the service channel for the service necessary for the user can be suppressed.

BRIEF DESCRIPTION OF DRAWINGS

The above and other objects, features, and advantages of the present disclosure will become more apparent from the following detailed description made with reference to the accompanying drawings. In the drawings.

DESCRIPTION OF EMBODIMENTS

First Embodiment

<Outline Configuration of Communication System 100>

Figure 1:
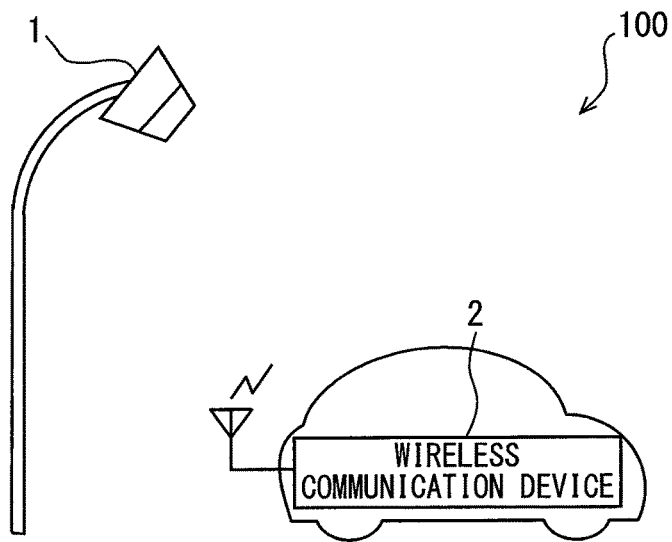
FIG. 1 is a diagram illustrating an exemplary outline configuration of a communication system.

Embodiments of the present disclosure will now be described with reference to the accompanying drawings. FIG. 1 is a diagram illustrating an exemplary outline configuration of a communication system 100 according to an embodiment of the present disclosure. The communication system 100 illustrated in FIG. 1 includes a provider terminal 1 and a wireless communication device 2. The provider terminal 1 acts as a roadside unit installed along a road. The wireless communication device 2 is used in a vehicle. The provider terminal 1 corresponds to a service provider terminal.

For the sake of convenience, the communication system 100 illustrated in FIG. 1 includes only one provider terminal 1. However, the communication system 100 is not limited to such a configuration. The communication system 100 may include a plurality of provider terminals 1.

The provider terminal 1 and the wireless communication device 2 exchange information about service provision by performing wireless communication in compliance with a well-known communication standard named WAVE (Wireless Access in Vehicular Environments). According to the WAVE standard, a control channel (CCH) and a service channel (SCH) exist so that communication is performed by switching between the control channel and the service channel. As an example, WAVE-compliant communication is performed by using a 5.9 GHz band. However, an alternative is to use a different frequency band such as a 5.8 GHz band or a 700 MHz band.

The control channel provides broadcasting in order to transfer a control signal necessary for connection control. In the communication system 100, a WSA (Wave Service Advertisement) is transmitted (or more specifically, broadcast) on the control channel from the provider terminal 1 as the control signal necessary for connection control. The WSA will be described in detail later.

The service channel is used to provide a service. A plurality of different service channels are used depending on the service to be provided. Unicast or multicast communication is performed on the service channels. Frequencies used by the service channels are different from those used by the control channel.

<Outline Configuration of Provider Terminal 1>

An outline configuration of the provider terminal 1 will now be described with reference to FIG. 2. Installed along a road as mentioned earlier, the provider terminal 1 performs WAVE-compliant wireless communication (hereinafter simply referred to as wireless communication) with the wireless communication device 2 used in a vehicle within the wireless communication area of the provider terminal 1.

The provider terminal 1 may be installed at a location appropriate for the provider terminal 1 to provide a service. When, for instance, the provider terminal 1 provides a service related to the use of a store, the provider terminal 1 may be installed at the roadside near the store. When the provider terminal 1 provides a service related to the use of a parking lot, the provider terminal 1 may be installed at the roadside near the parking lot. When the provider terminal 1 provides a service limited to a predetermined area on a road, the provider terminal 1 may be installed at the roadside near the area.

The service related to the use of a store is, for example, an automatic payment service at a drive-through store. The service related to the use of a parking lot is, for example, a parking fee payment service at a toll parking lot. The service limited to a predetermined area on a road is, for example, a passage support service at an intersection, a traffic congestion information service, or an automatic toll payment service. The wireless communication area of the provider terminal 1 may be set so as to exclude an area that is passed through by vehicles that are not to receive a service.

Figure 2:
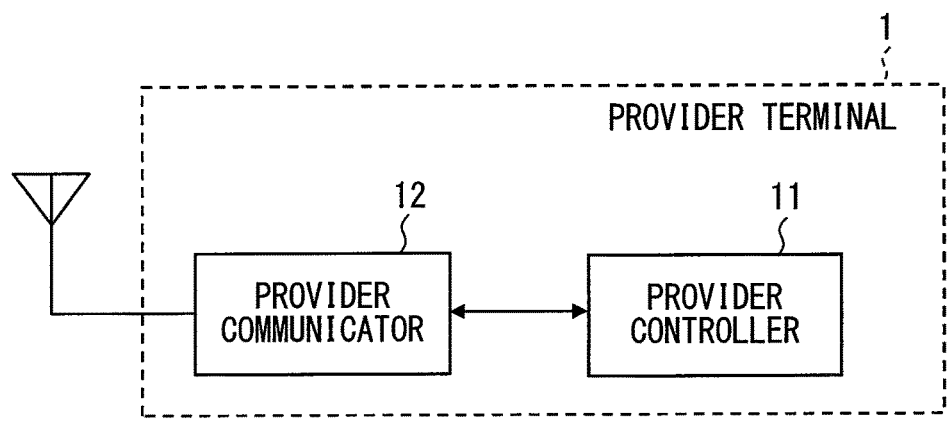
FIG. 2 is a block diagram illustrating an exemplary outline configuration of a provider terminal.

As illustrated in FIG. 2, the provider terminal 1 includes a provider controller 11 and a provider communicator 12. The provider communicator 12 performs wireless communication through a transmission/reception antenna. More specifically, the provider communicator 12 transmits a signal in compliance with an instruction from the provider controller 11, and outputs a signal received from the wireless communication device 2 to the provider controller 11.

The provider controller 11 includes a CPU, memories such as a ROM and a RAM, an I/O device, and a bus connecting these elements, and performs various processes by executing a control program stored in the ROM. Some or all functions executed by the provider controller 11 may be implemented by hardware such as one IC or a plurality of ICs.

The provider controller 11 controls the provider communicator 12 and changes the channel used for wireless communication of the provider communicator 12 at fixed time intervals (e.g., at 50 millisecond intervals). More specifically, the provider controller 11 switches between the control channel and a service channel assigned to the provider terminal 1. A point of time for switching between the control channel and the service channel can be set as appropriate. For example, it may be varied dynamically.

Additionally, at a point of time at which switching is made to the control channel, the provider controller 11 generates the WSA and causes the provider communicator 12 to transmit the generated WSA on the control channel.

The WSA includes a header, a PSID (Provider Service ID) indicative of the type of service provided by the provider terminal 1, a channel number indicative of the number of a service channel assigned to the provider terminal 1, and routing information. The channel number can be used to designate a service channel that the provider terminal 1 uses to provide a service. The WSA corresponds to a service initiation notice. The PSID corresponds to service type information. The channel number corresponds to channel designation information.

Further, at a point of time at which switching is made to a service channel, the provider controller 11 causes the provider communicator 12 to transmit, on the service channel, information for permitting a subject terminal to provide its service. The subsequent description will be given on the assumption that the information transmitted on a service channel includes the position of the provider terminal 1. It is assumed that the position of the provider terminal 1 is expressed, for example, by latitude and longitude.

Furthermore, when the provider controller 11 is to perform a provided-service-related process such as payment by using information transmitted from the wireless communication device 2, the provider controller 11 performs the process by using information received from the wireless communication device 2 through the provider communicator 12.

<Outline Configuration of Wireless Communication Device 2>

An outline configuration of the wireless communication device 2 will now be described with reference to FIG. 3. As mentioned earlier, the wireless communication device 2 is used in a vehicle. When located within the wireless communication area of the provider terminal 1, the wireless communication device 2 performs wireless communication (or more specifically, WAVE-compliant wireless communication) with the provider terminal 1. The wireless communication device 2 may be built (i.e., mounted) in the vehicle or simply carried into the vehicle and detachably attached, for example, to a holder. A vehicle using the wireless communication device 2 will be hereinafter referred to as the subject vehicle.

Figure 3:
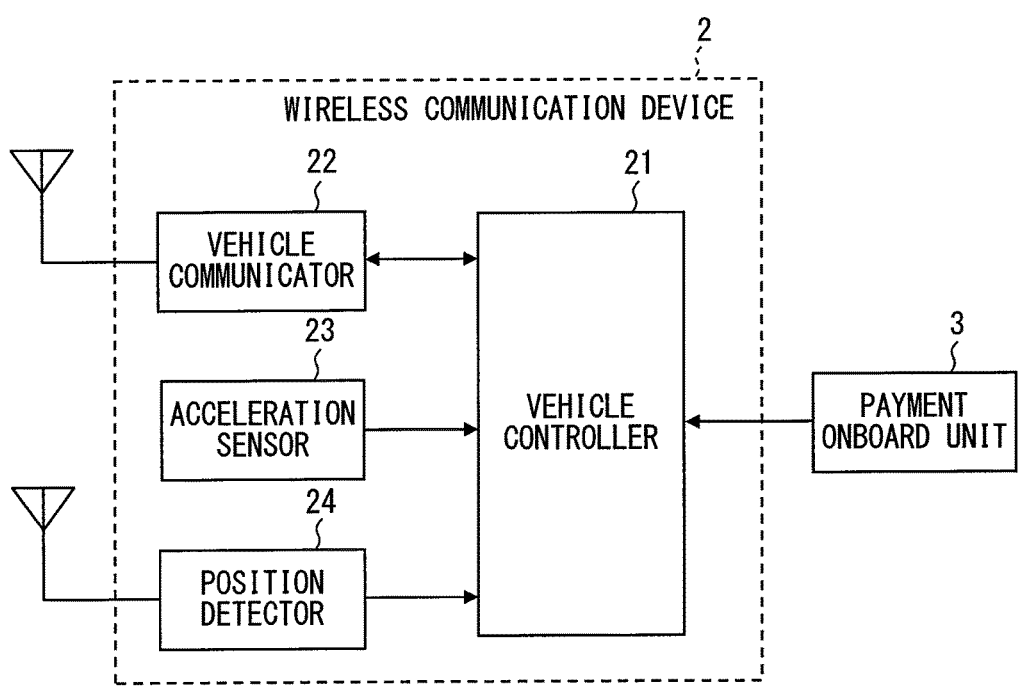
FIG. 3 is a block diagram illustrating an exemplary outline configuration of a wireless communication device.

As illustrated in FIG. 3, the wireless communication device 2 is connected to a payment onboard unit 3, and includes a vehicle controller 21, a vehicle communicator 22, an acceleration sensor 23, and a position detector 24. The connection between the wireless communication device 2 and the payment onboard unit 3 may be wired or wireless. However, the present embodiment will be described on the assumption that a wired connection is made through an interface.

The payment onboard unit 3, which is used for an automatic payment service, provides automatic payment in coordination with the wireless communication device 2. The payment onboard unit 3 includes a slot for reading information from an IC card for payment, and reads payment information from the IC card inserted into the slot. The payment onboard unit 3 transmits the read payment information to the wireless communication device 2. The payment onboard unit 3 also transmits other items of information to the wireless communication device 2, including a connection signal indicative of a connection to the wireless communication device 2 and a card presence signal indicative of whether an IC card is inserted into the slot.

The vehicle communicator 22 performs wireless communication through a transmission/reception antenna. The vehicle communicator 22 corresponds to a communicator. More specifically, the vehicle communicator 22 outputs a signal received from the provider terminal 1 to the vehicle controller 21, and transmits a signal in compliance with an instruction from the vehicle controller 21.

The acceleration sensor 23 successively detects the acceleration of the subject vehicle. It is assumed, for example, that a three-axis acceleration sensor for detecting acceleration exerted in three orthogonal axial directions is used as the acceleration sensor 23. However, an acceleration sensor with a different number of axes may alternatively be used.

The position detector 24 includes a GNSS receiver that is used in a GNSS (Global Navigation Satellite System). Based on a signal received from a positioning satellite, the position detector 24 successively detects the current position of the subject vehicle. It is assumed that the detected current position (hereinafter referred to as the vehicle position) is expressed, for example, by latitude and longitude. The position detector 24 may be configured to detect the current position by supplementarily using, for example, the acceleration detected by the acceleration sensor 23 and a yaw rate detected by a gyro sensor.

The vehicle controller 21 includes a CPU, memories such as a ROM and a RAM, an I/O device, and a bus connecting these elements, and performs various processes by executing a control program stored in the ROM. The vehicle controller 21 will be described in detail later. Some or all functions executed by the vehicle controller 21 may be implemented by hardware such as one IC or a plurality of ICs.

<Outline Configuration of Vehicle controller 21>

Figure 4:
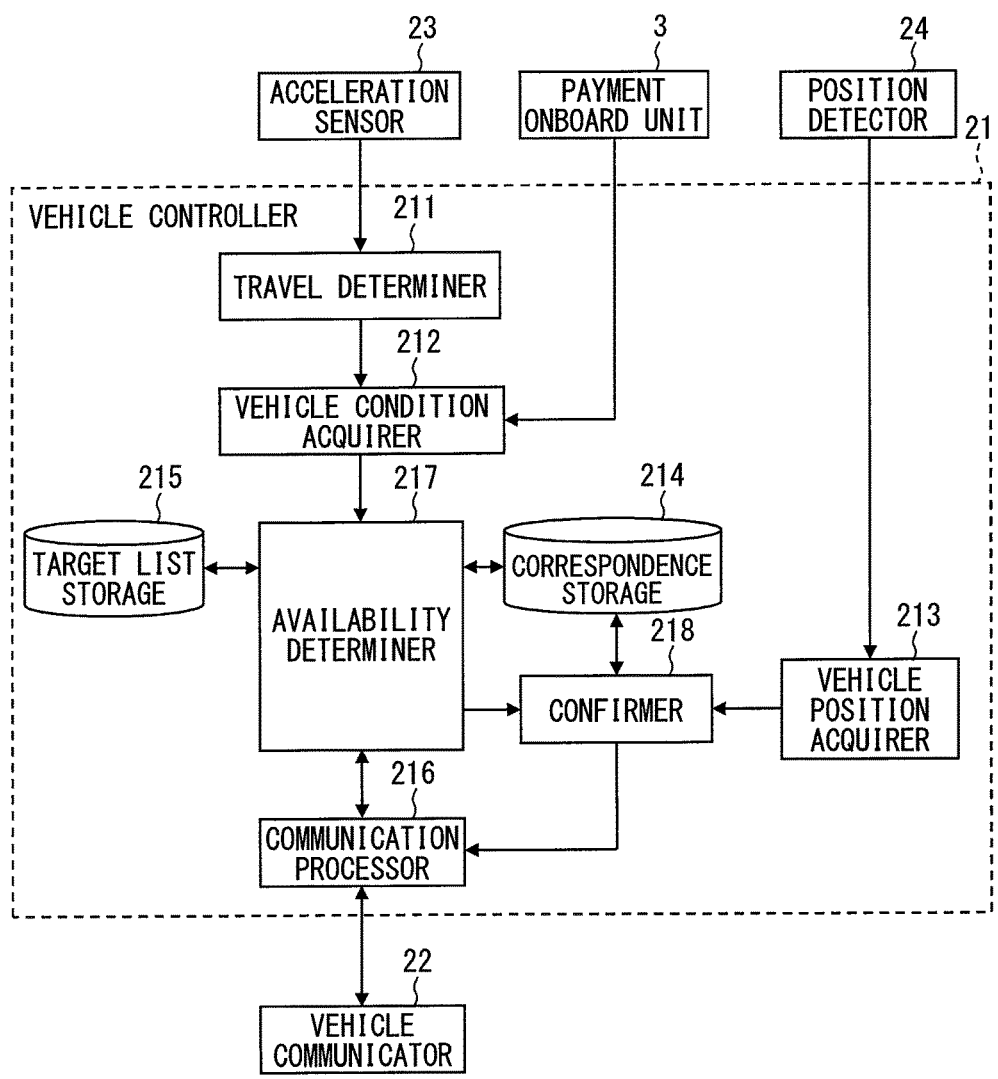
FIG. 4 is a block diagram illustrating an exemplary outline configuration of a vehicle controller.

An exemplary outline configuration of the vehicle controller 21 will now be described with reference to FIG. 4. As illustrated in FIG. 4, the vehicle controller 21 includes a travel determiner 211, a vehicle condition acquirer 212, a vehicle position acquirer 213, a correspondence storage 214, a target list storage 215, a communication processor 216, an availability determiner 217, and a confirmer 218.

Based on the acceleration successively detected by the acceleration sensor 23, the travel determiner 211 determines whether the subject vehicle is traveling. The subject vehicle may be determined to be traveling if, for example, a threshold value for distinguishing between the traveling state and stopped state of the vehicle is exceeded by the acceleration detected by the acceleration sensor. The subject vehicle may be determined to be stopped if the threshold value is not exceeded.

The vehicle condition acquirer 212 acquires the condition of the subject vehicle. More specifically, the vehicle condition acquirer 212 acquires the subject vehicle condition that determines the availability of a service received from the provider terminal 1.

As an example, the result of travel determination by the travel determiner 211 is acquired as the vehicle condition associated with a service that is unavailable in the traveling state and available in the stopped state. Further, the aforementioned connection signal and card presence signal transmitted from the payment onboard unit 3 are acquired as the vehicle condition associated with an automatic payment service. Whether the payment onboard unit 3 is present can be estimated depending on whether the connection signal is present. Thus, the connection signal corresponds to information indicative of whether the payment onboard unit is mounted in the vehicle. Further, the card presence signal corresponds to information indicative of whether payment can be settled by the payment onboard unit.

The vehicle position acquirer 213 successively acquires the vehicle position of the subject vehicle that is successively detected by the position detector 24. The vehicle position acquirer 213 corresponds to a position acquirer.

The correspondence storage 214 stores a correspondence table. The correspondence table defines the association between a PSID and a vehicle condition under which a service indicated by the PSID is available. In the correspondence table, for example, "stopped" is associated, as the vehicle condition, with the PSID of a service that is unavailable in the traveling state and available in the stopped state. Further, "connection signal present" and "card present" are associated, as the vehicle condition, with the PSID of an automatic payment service.

The PSID of an automatic payment service may be associated with either the "connection signal present" or "card present" vehicle condition. When, for instance, the employed payment onboard unit 3 does not use a payment IC card, only the "connection signal present" vehicle condition may be associated with the PSID of the automatic payment service. When the card presence signal is available, that is, when the payment onboard unit 3 is mounted in the subject vehicle, only the "card present" vehicle condition may be associated with the PSID of the automatic payment service.

Another alternative is to associate one PSID with a plurality of different vehicle conditions. For example, the "stopped" and "card present" vehicle conditions may be both associated with the PSID of the automatic payment service that is unavailable in the traveling state and available in the stopped state.

Further, it is assumed, for example, that the correspondence table in the present embodiment also associates a PSID with an availability area where a service indicated by the PSID is available. The availability area may be indicated, for example, by a set of latitude and longitude coordinates specifying the area. A correspondence table for associating each PSID with an availability area may be independent of the aforementioned correspondence table. For example, these two different correspondence tables may be stored in different memories.

Although a table is used to define the correspondence as described above, a map or other form may be employed to define the correspondence. Further, the table to be stored in the correspondence storage 214 need not always be fixed, but may be alterable, for example, by downloading a new table or by changing a storage medium.

The target list storage 215 stores a target list. The target list is a list of PSIDs of services available to the subject vehicle. As is the case with the correspondence table, the target list need not always be fixed, but may be alterable.

The communication processor 216 controls the vehicle communicator 22 to change the channel for wireless communication. By default, the communication processor 216 opens the control channel. When the vehicle communicator 22 receives a WSA transmitted on the control channel from the provider terminal 1, the communication processor 216 acquires information included in the WSA from the vehicle communicator 22. For example, the communication processor 216 acquires a PSID, a channel number, and routing information included in the WSA.

The communication processor 216 also opens and closes a service channel based on the result of determination by the later-described availability determiner 217 and on the result of confirmation by the confirmer 218. The process performed by the communication processor 216 will be described in detail later.

Based on the subject vehicle condition acquired by the vehicle condition acquirer 212 and on the PSID included in a WSA received from the provider terminal 1, the availability determiner 217 references the correspondence table stored in the correspondence storage 214, and determines whether a service provided by the provider terminal 1 is available under the current subject vehicle condition.

The confirmer 218 confirms whether the subject vehicle position acquired by the vehicle position acquirer 213 is within an area where a service determined by the availability determiner 217 to be available can be used. The processes performed by the availability determiner 217 and the confirmer 218 will also be described in detail later.

(Wireless Communication-related Process in Vehicle Controller 21)

A wireless communication-related process in the vehicle controller 21 will now be described with reference to the flowchart of FIG. 5. The wireless communication-related process is a process related to wireless communication with the provider terminal 1. The flowchart of FIG. 5 may be started when the ignition power of the subject vehicle turns on. It is assumed that the control channel opens by default when the flowchart of FIG. 5 starts.

First of all, in step S1, the vehicle condition acquirer 212 acquires the subject vehicle condition. As mentioned earlier, the subject vehicle condition acquired by the vehicle condition acquirer 212 is, for example, the result of travel determination by the travel determiner 211 or the connection signal or card presence signal transmitted from the payment onboard unit 3.

If, in step S2, information included in a WSA is acquired by the communication processor 216 (S2 is "YES"), it is concluded that a WSA transmitted on the control channel from the provider terminal 1 is received by the vehicle communicator 22. Upon completion of step S2, processing proceeds to step S3. By contrast, if the information included in the WSA is not acquired by the communication processor 216 (S2 is "NO"), it is concluded that no WSA is received. In this instance, processing proceeds to step S12.

In step S3, based on the subject vehicle condition acquired in step S1 and on the PSID included in the WSA received from the provider terminal 1, the availability determiner 217 references the correspondence table stored in the correspondence storage 214 to determine whether a service provided by the provider terminal 1 is available under the current subject vehicle condition.

If the subject vehicle condition acquired in S1 is "stopped" in a situation where, for example, the "stopped" vehicle condition is associated with the PSID included in the WSA received from the provider terminal 1, it is determined that the service provided by the provider terminal 1 is available under the current subject vehicle condition. By contrast, if the subject vehicle condition acquired in S1 is "traveling", it is determined that the service provided by the provider terminal 1 is unavailable.

If it is determined in step S4 that the service provided by the provider terminal 1 is available under the current subject vehicle condition (S4 is "YES"), processing proceeds to step S5. By contrast, if the service is determined to be unavailable (S4 is "NO"), processing proceeds to step S12.

In step S5, the availability determiner 217 determines whether the PSID included in the WSA received from the provider terminal 1 is on the target list stored in the target list storage 215. That is, the availability determiner 217 determines whether the service provided by the provider terminal 1 is intended for the subject vehicle. If the PSID is determined to be on the target list (S5 is "YES"), processing proceeds to step S6. By contrast, if the PSID is not determined to be on the target list (S5 is "NO"), processing proceeds to step S12.

In step S6, the communication processor 216 opens a service channel (SCH) having the channel number included in the WSA received from the provider terminal 1, and initiates wireless communication on the service channel for the service provided by the provider terminal 1. For the sake of convenience, a process related to the service itself is not described here.

In step S7, the vehicle position acquirer 213 acquires the subject vehicle position detected by the position detector 24. In step S8, based on the subject vehicle position acquired in S7 and on the PSID included in the WSA received from the provider terminal 1, the availability determiner 217 references the correspondence table stored in the correspondence storage 214 to determine whether the subject vehicle position is within the availability area associated with the PSID. That is, the availability determiner 217 determines whether the service provided by the provider terminal 1 is available at the subject vehicle position. If it is determined that the service is available at the subject vehicle position (S8 is "YES"), processing proceeds to step S9. By contrast, if it is determined that the service is unavailable at the subject vehicle position (S8 is "NO"), processing proceeds to step S10. In step S10, the communication processor 216 closes the open service channel (SCH).

If the service provided by the provider terminal 1 is completed in step S9 (S9 is "YES"), processing proceeds to S10. In S10, the communication processor 216 closes the open service channel. By contrast, if the service provided by the provider terminal 1 is not completed (S9 is "NO"), processing returns to S7 to repeat steps S7 and beyond.

After the open service channel is closed in S10, the communication processor 216 opens the control channel (CCH) in step S11. If, in step S12, the wireless communication-related process is at a time point of termination (S12 is "YES"), the wireless communication-related process terminates. By contrast, if the wireless communication-related process is not at a time point of termination (S12 is "NO"), processing returns to S1 to repeat the process. The time point of termination of the wireless communication-related process is, for example, a point of time at which the ignition power of the subject vehicle turns off.

Figure 5:
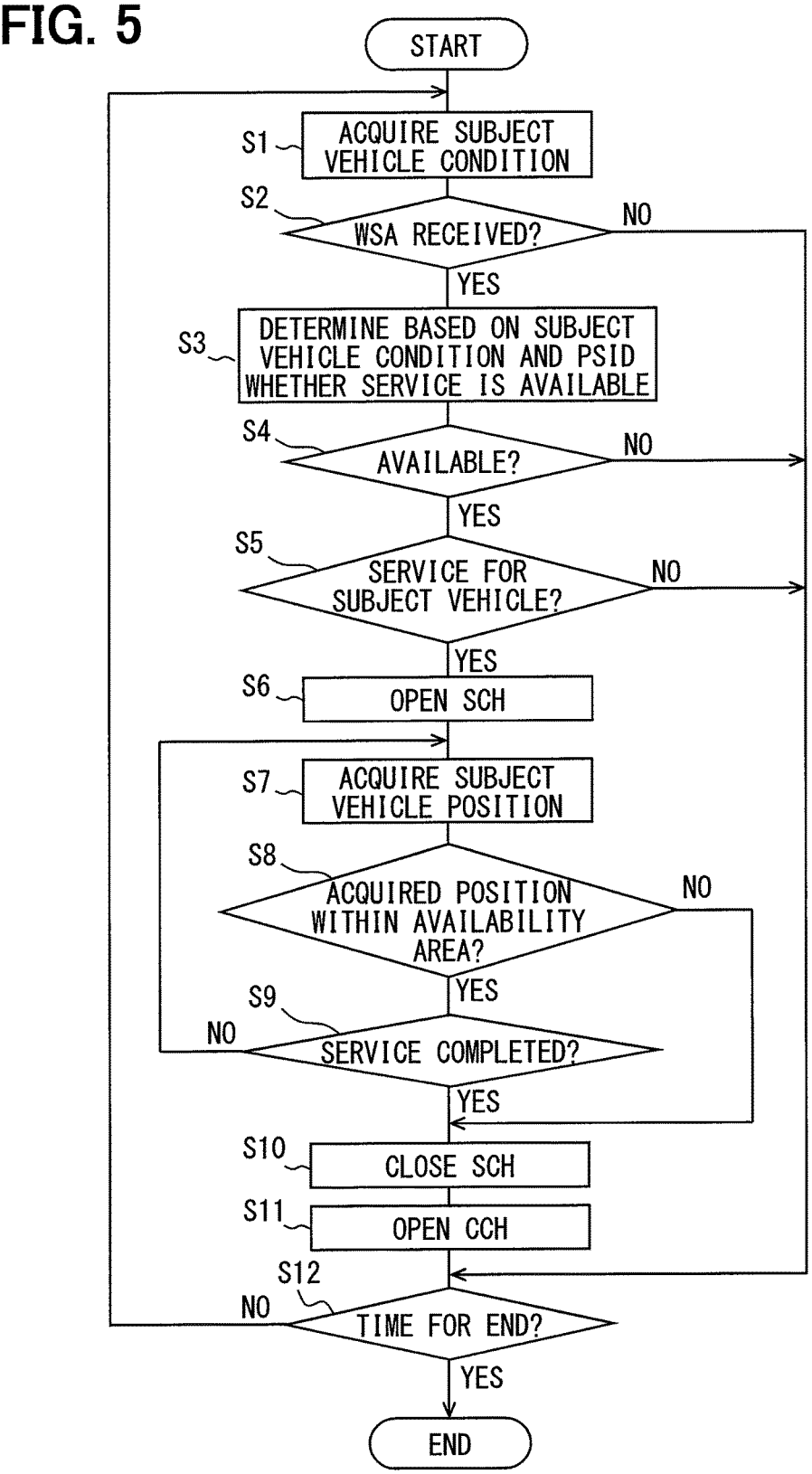
FIG. 5 is a flowchart illustrating an exemplary flow of a wireless communication-related process in the vehicle controller.

The flowchart of FIG. 5 serves as an example only. For example, S5 may be performed before S3 and S4.

Advantageous Effects of First Embodiment

The correspondence storage 214 stores the correspondence table that defines the association between a PSID and a subject vehicle condition under which a service indicated by the PSID is available. Therefore, whether a service provided by the provider terminal 1 from which a WSA is transmitted is available under the current subject vehicle condition can be determined by the availability determiner 217 depending on whether the association between a PSID included in the WSA received by the vehicle communicator 22 and the subject vehicle condition acquired by the vehicle condition acquirer 212 is defined by the correspondence table stored in the correspondence storage 214.

It can be said that a service unavailable under the current subject vehicle condition determined by the availability determiner 217 is unnecessary for a user. As the communication processor 216 does not allow a relevant service channel to open, the vehicle communicator 22 does not open the service channel for the service unnecessary for the user. This suppresses the occurrence of a situation where a service channel for a service necessary for the user cannot be opened due to a service channel already open for an unnecessary service. As a result, the delay in the opening of the service channel for the service necessary for the user can be suppressed.

Further, according to the configuration of the first embodiment described above, an existing WSA, which is transmitted from the provider terminal 1 by performing WAVE-compliant wireless communication, can be used to enable the availability determiner 217 to determine whether a service provided by the provider terminal 1 from which the WSA is transmitted is available under the current subject vehicle condition. Therefore, the first embodiment is advantageous in that there is no need to change an existing configuration of the provider terminal 1 from which a service is to be provided.

Moreover, according to the configuration of the first embodiment, even when a service channel is opened for a service determined by the availability determiner 217 to be available, the service channel closes if the confirmer 218 confirms that the subject vehicle position is not within an area where the service is enjoyable. Therefore, even when a service channel for a service unavailable under the current subject vehicle condition is erroneously opened, the erroneously opened service channel can be closed immediately. Accordingly, a service channel for an unnecessary service does not remain open. This suppresses the occurrence of a situation where a service channel for a service necessary for the user cannot be opened.

Second Embodiment

The first embodiment is configured so as to open a service channel after the availability determiner 217 determines that a service provided by the provider terminal 1 is available under the current subject vehicle condition. However, the present disclosure is not limited to such a configuration. For example, an alternative configuration (hereinafter referred to as the second embodiment) may be employed so that a currently open service channel having the channel number included in a WSA received from the provider terminal 1 is closed immediately depending on the result of determination by the availability determiner 217.

The second embodiment will now be described with reference to the accompanying drawings. For convenience of explanation, in the following description of the second embodiment and in the subsequent description, elements having the same functionality as the elements depicted in the drawings used for earlier description are designated by the same reference numerals as their counterparts and will not be redundantly described.

The second embodiment is similar to the first embodiment except that the former includes a vehicle controller 21a in place of the vehicle controller 21. The vehicle controller 21a is similar to the vehicle controller 21 in the first embodiment except for some differences in the order of processing steps in the wireless communication-related process.

<Outline Configuration of Vehicle Controller 21a>

Figure 6:
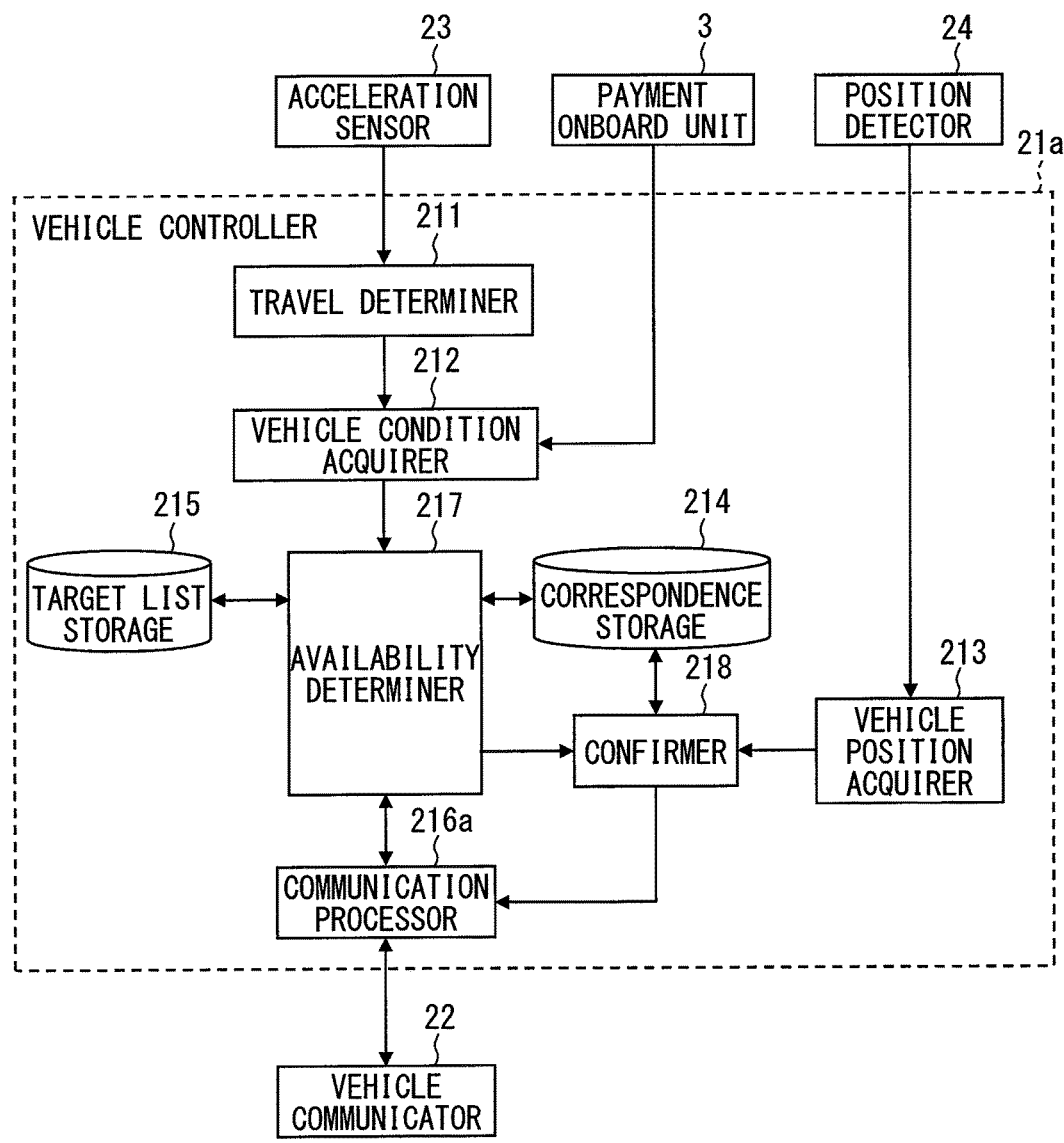
FIG. 6 is a block diagram illustrating an exemplary outline configuration of the vehicle controller.

An exemplary outline configuration of the vehicle controller 21a will now be described with reference to FIG. 6. As illustrated in FIG. 6, the vehicle controller 21a includes the travel determiner 211, the vehicle condition acquirer 212, the vehicle position acquirer 213, the correspondence storage 214, the target list storage 215, a communication processor 216a, the availability determiner 217, and the confirmer 218.

The communication processor 216a is similar to the communication processor 216 except that they partly differ in processing. When the vehicle communicator 22 receives a WSA transmitted from the provider terminal 1, the communication processor 216a opens a service channel having the channel number included in the WSA. Further, the communication processor 216a closes a service channel depending on the result of determination by the availability determiner 217.

(Wireless Communication-related Process in Vehicle Controller 21a)

The wireless communication-related process in the vehicle controller 21a will now be described with reference to the flowchart of FIG. 7. The flowchart of FIG. 7 may be started when the ignition power of the subject vehicle turns on. It is assumed that the control channel opens by default when the flowchart of FIG. 7 starts.

First of all, steps S21 and S22 are performed in the same manner as in S1 and S2. If information included in a WSA is acquired by the communication processor 216a (S22 is "YES"), processing proceeds to step S23. If no such information is acquired (S22 is "NO"), processing proceeds to step S32.

In step S23, as is the case with S6, the communication processor 216a opens a service channel having the channel number included in the WSA received from the provider terminal 1, and initiates wireless communication on the service channel for the service provided by the provider terminal 1. In step S24, processing is performed in the same manner as in S3.

If the result of determination in step S24 indicates in step S25 that the service provided by the provider terminal 1 is available under the current subject vehicle condition (S25 is "YES"), processing proceeds to step S26. By contrast, if the result of determination indicates that the service is unavailable (S25 is "NO"), processing proceeds to step S30. In step S30, the communication processor 216a closes the open service channel.

In step S26, processing is performed in the same manner as in S5. If it is determined in step S26 that the PSID included in the WSA is on the target list (S26 is "YES"), processing proceeds to step S27. By contrast, if it is determined that the PSID included in the WSA is not on the target list (S26 is "NO"), processing proceeds to step S30. In step S30, the communication processor 216a closes the open service channel.

In steps S27 to S32, processing is performed in the same manner as in steps S7 to S12. If it is determined in S28 that the service provided by the provider terminal 1 is available at the subject vehicle position acquired in S27 (S28 is "YES"), processing proceeds to step S29. By contrast, if it is determined that the service provided by the provider terminal 1 is not available at the subject vehicle position (S28 is "NO"), processing proceeds to step S30. In step S30, the communication processor 216a closes the open service channel. If it is determined in S29 that the service provided by the provider terminal 1 is completed (S29 is "YES"), processing proceeds to S30. In step S30, the communication processor 216a closes the open service channel. By contrast, if it is determined that the service provided by the provider terminal 1 is not completed (S29 is "NO"), processing returns to S27 to repeat steps S27 and beyond. After the open service channel is closed in S30, the communication processor 216a opens the control channel (CCH) in step S31. If in step S32, the wireless communication—related process is at a time point of termination (S32 is "YES"), the wireless communication-related process terminates. By contrast, if the wireless communication-related process is not at a time point of termination (S32 is "NO"), processing returns to S21 to repeat the process. The time point of termination of the wireless communication-related process is, for example, a point of time at which the ignition power of the subject vehicle turns off.

Figure 7:
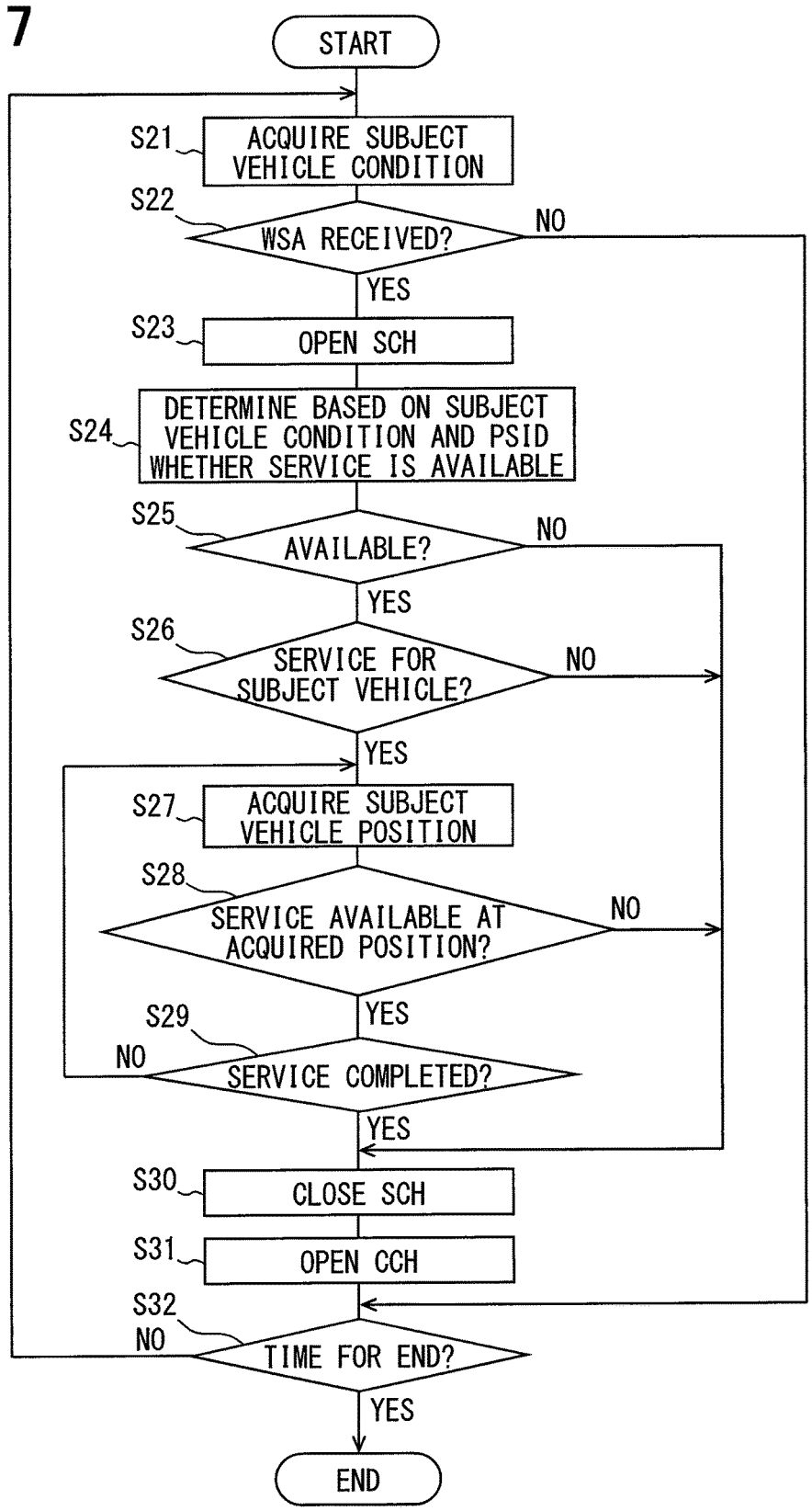
FIG. 7 is a flowchart illustrating an exemplary flow of the wireless communication-related process in the vehicle controller.

The flowchart of FIG. 7 serves as an example only. For example, S26 may be performed before S24 and S25.

Advantageous Effects of Second Embodiment

Even when a service channel is opened based on the channel number included in a WSA, the vehicle communicator 22 closes the service channel upon the availability determiner 217 determining that the service provided on the service channel is unavailable. Thus, even when a service channel for a service unnecessary for the user is opened, the service channel for the unnecessary service can be closed immediately. Therefore, the service channel for the unnecessary service does not remain open. This suppresses the occurrence of a situation where a service channel for a service necessary for the user cannot be opened. As a result, the delay in the opening of the service channel for the service necessary for the user can be suppressed.

Further, according to the configuration of the second embodiment, even when a service channel is left open because the availability determiner 217 determined that the service provided on the service channel is available, the service channel closes upon the confirmer 218 confirming that the subject vehicle position is not within an area where the service is available. Therefore, the service channel for the unnecessary service does not remain open. This suppresses the occurrence of a situation where a service channel for a service necessary for the user cannot be opened.

Moreover, as is the case with the configuration of the first embodiment, the configuration of the second embodiment is advantageous in that there is no need to change an existing configuration of the provider terminal 1 from which a service is to be provided.

First Modification

The first and second embodiments are configured so that the confirmer 218 is added to the vehicle controller 21, 21a. Alternatively, however, the confirmer 218 may be excluded from the configuration. When the confirmer 218 is not included in the vehicle controller 21, 21a, the configuration according to a later-described second modification may be employed.

Second Modification

The first and second embodiments are configured so that the subject vehicle position acquired by the vehicle position acquirer 213 is used to confirm service availability. However, the present disclosure is not limited to such a configuration. For example, an alternative configuration (hereinafter referred to as the second modification) may be employed so that the subject vehicle position acquired by the vehicle position acquirer 213 is used as the vehicle condition.

The second modification is similar to the first and second embodiments except that the former includes a vehicle controller 21b in place of the vehicle controller 21, 21a.

Figure 8:
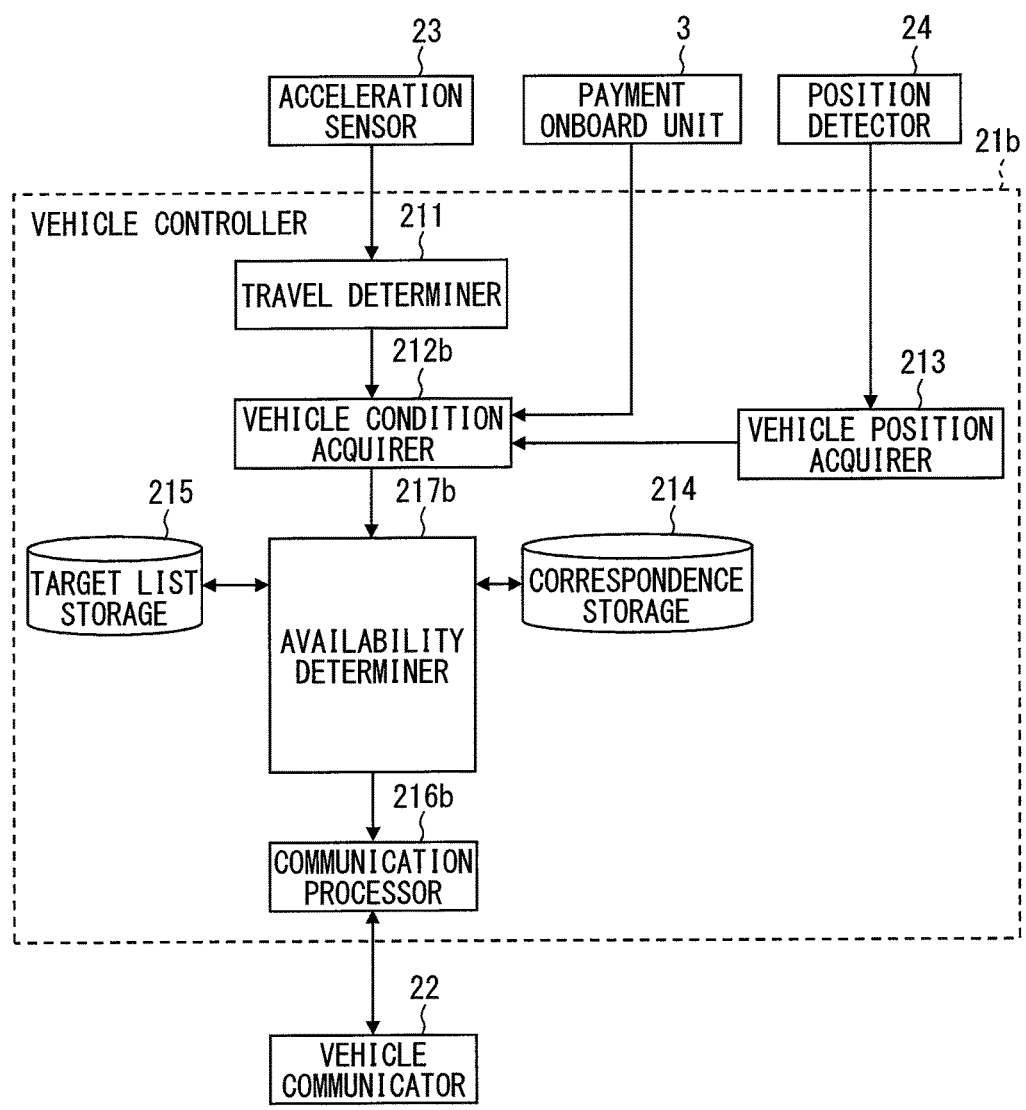
FIG. 8 is a block diagram illustrating an exemplary outline configuration of the vehicle controller.

An exemplary outline configuration of the vehicle controller 21b will now be described with reference to FIG. 8. As illustrated in FIG. 8, the vehicle controller 21b includes the travel determiner 211, a vehicle condition acquirer 212b, the vehicle position acquirer 213, the correspondence storage 214, the target list storage 215, a communication processor 216b, and an availability determiner 217b.

The vehicle condition acquirer 212b is similar to the vehicle condition acquirer 212 except that they partly differ in processing. The vehicle condition acquirer 212b acquires the subject vehicle position acquired by the vehicle position acquirer 213 as the subject vehicle condition.

The communication processor 216b is similar to the communication processor 216, 216a except that they partly differ in processing. The communication processor 216b opens or closes a service channel depending on the result of determination by the availability determiner 217b.

The availability determiner 217b is similar to the availability determiner 217 except that they partly differ in the information used for determination. Based on the vehicle position represented by the subject vehicle condition acquired by the vehicle condition acquirer 212b and on the PSID included in a WSA received from the provider terminal 1, the availability determiner 217b references the correspondence table stored in the correspondence storage 214. Then, depending on whether the correspondence table indicates that the subject vehicle position is within an availability area associated with the PSID, the availability determiner 217b determines whether the service provided by the provider terminal 1 is available under the current subject vehicle condition.

The availability determiner 217b may make a determination by additionally using, for example, the result of travel determination by the travel determiner 211 or the connection signal or card presence signal transmitted from the payment onboard unit 3.

The wireless communication-related process in the first modification will now be described. The wireless communication-related process in the first modification differs from the wireless communication-related process in the first embodiment in that the vehicle condition acquirer 212b acquires the vehicle position as the subject vehicle condition in S1, and that the vehicle position is included as the condition for determination in S3, and further that S7 and S8 are skipped. Further, the wireless communication-related process in the first modification differs from the wireless communication-related process in the second embodiment in that the vehicle condition acquirer 212b acquires the vehicle position as the subject vehicle condition in S21, and that the vehicle position is included as the condition for determination in S24, and further that S27 and S28 are skipped.

As is the case with the configuration of the first embodiment, the configuration of the second modification also suppresses the delay in the opening of a service channel for a service necessary for the user.

Third Modification

Another alternative configuration (hereinafter referred to as the third modification) may be employed so that a provider terminal 1 from which the subject vehicle is moving away is invalidated to inhibit the wireless communication device 2 from processing the provider terminal 1. The third modification will be described below with reference to an accompanying drawing. The third modification is similar to the first embodiment except that the former includes a vehicle controller 21c in place of the vehicle controller 21.

<Outline Configuration of Vehicle Controller 21c>

Figure 9:
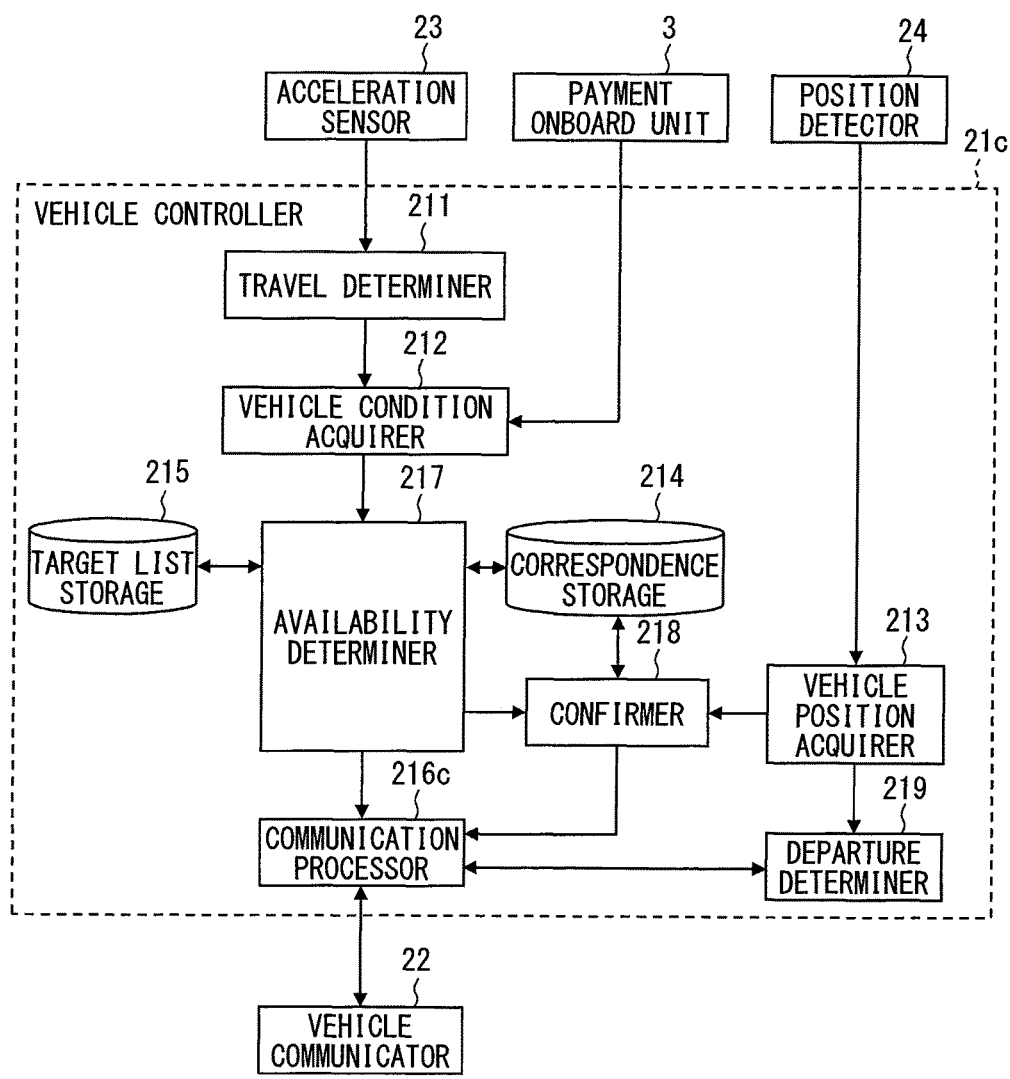
FIG. 9 is a block diagram illustrating an exemplary outline configuration of the vehicle controller.

An exemplary outline configuration of the vehicle controller 21c will now be described with reference to FIG. 9. As illustrated in FIG. 9, the vehicle controller 21c includes the travel determiner 211, the vehicle condition acquirer 212, the vehicle position acquirer 213, the correspondence storage 214, the target list storage 215, a communication processor 216c, the availability determiner 217, the confirmer 218, and a departure determiner 219.

Based on the subject vehicle position successively acquired by the vehicle position acquirer 213 and on the position of the provider terminal 1 that is received by the communication processor 216c through the vehicle controller 22, the departure determiner 219 determines whether the subject vehicle is leaving the provider terminal 1. For example, when there is an increase in a successively calculated distance between the subject vehicle position and the position of the provider terminal 1, the departure determiner 219 may determine that the subject vehicle is leaving the provider terminal 1.

The communication processor 216c is similar to the communication processor 216 except that they partly differ in processing. When the departure determiner 219 determines that the subject vehicle is leaving a provider terminal 1, the communication processor 216c excludes this provider terminal 1 from processing targets.

If, for example, the departure determiner 219 determines that the subject vehicle is leaving a provider terminal 1, identification information (e.g., routing information or device ID) identifying the provider terminal 1 is recorded in the memory in the vehicle controller 21c as the identification information not targeted for processing. When a signal including the identification information matching the stored identification information not targeted for processing is received from a provider terminal 1, the vehicle controller 21c excludes this provider terminal 1 from processing targets, that is, does not permit, for example, the availability determiner 217 to perform processing for the provider terminal 1.

When the subject vehicle is leaving a provider terminal 1, it is conceivable that the provider terminal 1 is not necessary for the subject vehicle. In this respect, the third modification excludes the provider terminal 1 leaving the subject vehicle from the processing targets. This inhibits the wireless communication device 2 from performing an unnecessary process and allows the wireless communication device 2 to preferentially process a different provider terminal 1 that may be necessary for the subject vehicle. It should be noted that the third modification may be combined with the second embodiment.

Fourth Modification

The first and second embodiments are configured so that the travel determiner 211 determines, based on the acceleration detected by the acceleration sensor 23, whether a vehicle using the wireless communication device 2 is traveling. However, the present disclosure is not limited to such a configuration. An alternative method may be used to determine whether the vehicle is traveling. If, for example, signals can be acquired from a vehicle speed sensor and a shift position sensor, whether the vehicle is traveling may be determined based on such signals.

Fifth Modification

The first and second embodiments are configured so that the wireless communication device 2 is connected to the payment onboard unit 3. However, the present disclosure is not limited to such a configuration. An alternative configuration may be employed so as to permit the wireless communication device 2 to perform a vehicular process for automatic payment.

Sixth Modification

The first and second embodiments have been described on the assumption that the provider terminal 1 is a roadside unit installed at a roadside. However, the present disclosure is not limited to such a configuration. For example, an alternative configuration may be employed so that the provider terminal 1 is mounted in a movable object such as an automobile.

The present disclosure is not limited to the above-described embodiments and modifications. The embodiments and modifications may be variously modified. For example, technical elements described in conjunction with the foregoing embodiments and modifications may be appropriately combined to obtain an embodiment that falls within the present disclosure.

The invention claimed is:

1. A wireless communication device used in a vehicle, comprising:
a communicator that performs wireless communication with a service provider terminal, wherein the service provider terminal switches between a control channel for communication connection control and a plurality of service channels for service provision,
wherein the communicator receives a service initiation notice, which is transmitted on the control channel from the service provider terminal and which includes service type information indicative of type of service provided by the service provider terminal and channel designation information designating a service channel to be used for service provision from the service provider terminal;
a controller having:
a correspondence storage that stores a correspondence of what type of service is available under what condition of the vehicle; and
a processor configured to:
acquire a condition of the vehicle;
determine whether the service provided by the service provider terminal from which the service initiation notice is transmitted is available under the condition of the vehicle that is acquired by the processor, based on
the service type information included in the service initiation notice received by the communicator,
the condition of the vehicle that is acquired by the processor, and
the correspondence stored in the correspondence storage,
wherein, when the processor determines that the service is unavailable, the communicator does not open the service channel designated by the channel designation information included in the service initiation notice; and
wherein the wireless communication device is mounted in the vehicle;
wherein based on determining by the processor that the service is available, the communicator opens the service channel designated by the channel designation information, the processor being further configured to: successively acquire a current position of the vehicle; and confirm whether the current position of the vehicle that is acquired by the processor is within an area where the service determined by the availability determiner to be available is available;
and wherein even when the service channel is opened based on determining by the processor that the service is available, the communicator closes the service channel upon the processor confirming that the current position of the vehicle that is acquired by the processor is not within the area where the service determined by the processor to be available is available.

2. The wireless communication device according to claim 1, wherein the processor is further configured to:
determine whether the vehicle is traveling; and
acquire, as the condition of the vehicle, information that is generated by the processor and indicative of whether the vehicle is traveling.

3. The wireless communication device according to claim 1, wherein:
the service includes an automatic payment service; and
the processor is further configured to acquire, as the condition of the vehicle, at least either one of information indicative of whether a payment onboard unit, which performs automatic payment in coordination with the wireless communication device, is mounted in the vehicle and information indicative of whether the payment onboard unit is in a payment-capable state.

4. The wireless communication device according to claim 1, wherein
the processor is further configured to successively acquire the current position of the vehicle as the condition of the vehicle.

5. The wireless communication device according to claim 1, wherein
the communicator further receives a position of the service provider terminal, the position being transmitted from the service provider terminal,
the processor being further configured to:
successively acquire a current position of the vehicle; and
determine whether the vehicle is leaving the service provider terminal, based on the current position of the vehicle that is successively acquired by the processor and on the position of the service provider terminal that is received by the communicator,
wherein
when the processor determines that the vehicle is leaving the service provider terminal, the wireless communication device excludes the service provider terminal from processing targets.

6. The wireless communication device according to claim 1; wherein
the communicator further receives a position of the service provider terminal, the position being transmitted from the service provider terminal,
the processor being further configured to:
determine whether the vehicle is leaving the service provider terminal, based on the successively acquired current position of the vehicle and on the position of the service provider terminal that is received by the communicator,
wherein
when the processor determines that the vehicle is leaving the service provider terminal, the wireless communication device excludes the service provider terminal from processing targets.

7. A wireless communication device used in a vehicle, comprising:
a communicator that performs wireless communication with a service provider terminal, wherein the service provider terminal switches between a control channel for communication connection control and a plurality of service channels for service provision,
wherein the communicator receives a service initiation notice, which is transmitted on the control channel from the service provider terminal and which includes service type information indicative of type of service provided by the service provider terminal and channel designation information designating a service channel to be used for service provision from the service provider terminal,
wherein the communicator, upon receipt of the service initiation notice, opens a service channel designated by the channel designation information included in the service initiation notice;
a controller having:
a correspondence storage that stores a correspondence of what type of service is available under what condition of the vehicle; and
a processor configured to:
acquire a condition of the vehicle;
determine whether the service provided by the service provider terminal from which the service initiation notice is transmitted is available under the condition of the vehicle that is acquired by the vehicle condition acquirer, based on
the service type information included in the service initiation notice received by the communicator,
the condition of the vehicle that is acquired by the processor, and
the correspondence stored in the correspondence storage,
wherein:
when the processor determines that the service is unavailable, the communicator closes the service channel that is opened based on the channel designation information included in the service initiation notice; and
the wireless communication device is mounted in the vehicle.

* * * * *